United States Patent
Exter

[11] Patent Number: 6,021,976
[45] Date of Patent: Feb. 8, 2000

[54] OPERATION OF A HELICOPTER

[75] Inventor: Paul Brian Exter, Pretoria, South Africa

[73] Assignee: Denel (Proprietary) Limited, Pretoria, South Africa

[21] Appl. No.: 08/981,888

[22] PCT Filed: Jul. 23, 1996

[86] PCT No.: PCT/EP96/03234

§ 371 Date: Jan. 5, 1998

§ 102(e) Date: Jan. 5, 1998

[87] PCT Pub. No.: WO97/05016

PCT Pub. Date: Feb. 13, 1997

[30] Foreign Application Priority Data

Jul. 25, 1995 [ZA] South Africa ................... 95/6180

[51] Int. Cl.$^7$ ................................................ B64C 27/82
[52] U.S. Cl. ................ 244/17.19; 244/52; 244/12.5; 239/265.23; 239/265.29
[58] Field of Search .................. 244/17.19, 51, 244/52, 73 C, 207, 12.5; 239/265.27, 265.23, 265.19, 265.31, 265.29

[56] References Cited

U.S. PATENT DOCUMENTS

| | | |
|---|---|---|
| 3,026,068 | 3/1962 | Spearman . |
| 3,807,662 | 4/1974 | Velazquez . |
| 3,957,226 | 5/1976 | Daggett et al. . |
| 4,200,252 | 4/1980 | Logan et al. . |
| 4,398,682 | 8/1983 | Bithrey . |
| 4,660,785 | 4/1987 | Munski . |
| 5,676,335 | 10/1997 | Murgia et al. . |

FOREIGN PATENT DOCUMENTS

| | | |
|---|---|---|
| 2 412 462 | 7/1979 | France . |
| 2 238 996 | 6/1991 | United Kingdom . |

*Primary Examiner*—Peter M. Poon
*Assistant Examiner*—Tien Dinh
*Attorney, Agent, or Firm*—Kenyon & Kenyon

[57] ABSTRACT

A thruster for a helicopter is mounted in a rear portion of a tail boom. Two sets of vanes deflect an airflow stream flowing along the tail boom respectively to opposed sides of the tail boom. Two shutters are pivotally arranged partly around the sets of vanes to leave two openings in respective sides of the tailboom. The shutters are pivoted in sympathy toward each other or away from each other to open/close the respective openings symmetrically and simultaneously such that a geometrical center line of each opening remains static irrespective of the status of the opening.

18 Claims, 3 Drawing Sheets

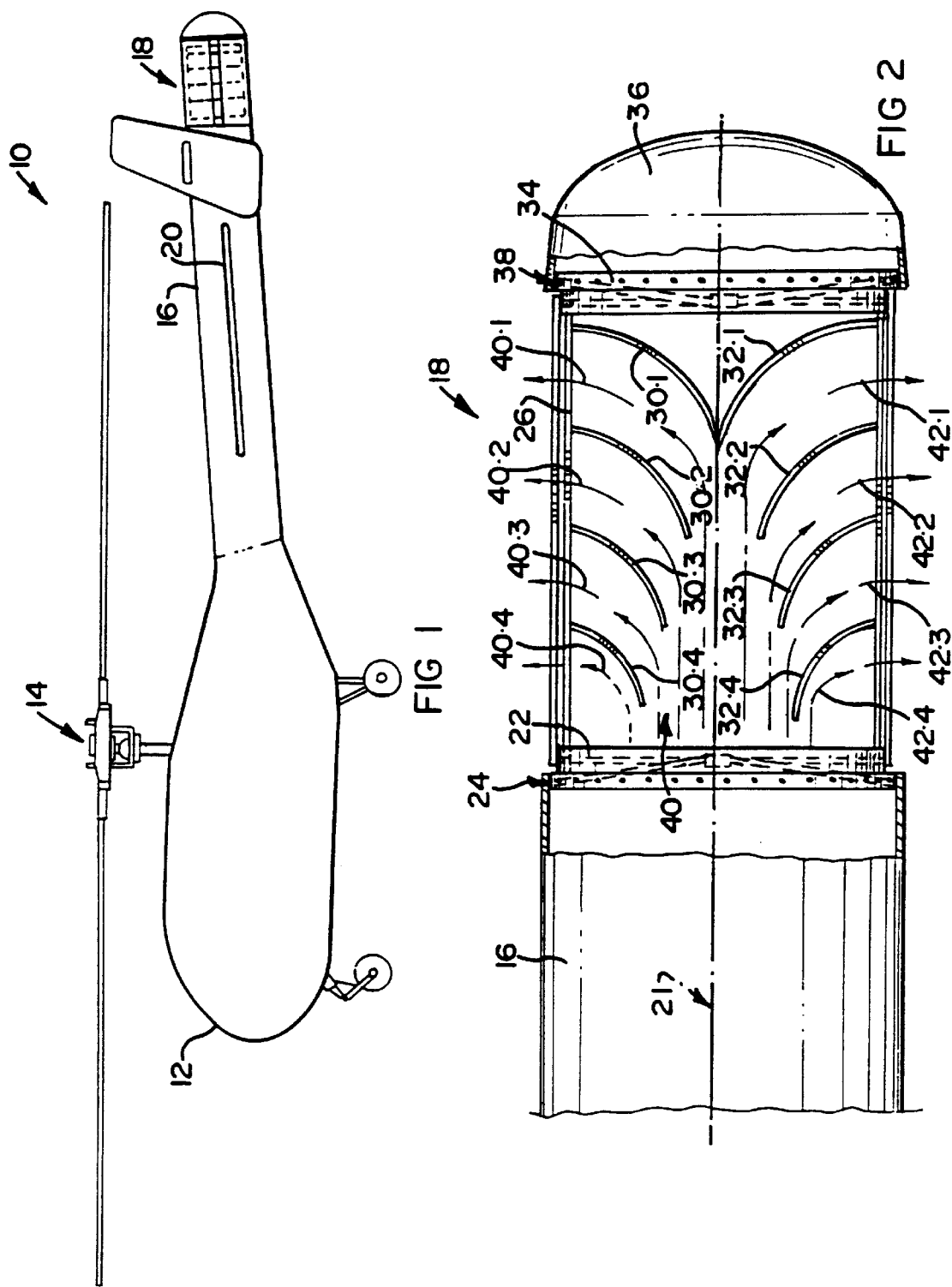

OPERATION OF A HELICOPTER

OPERATION OF A HELICOPTER

THIS INVENTION relates to operation of a helicopter. It relates more specifically to a method of controlling yaw of a helicopter. It further relates to a thruster for a helicopter, and to a helicopter.

It is known, for example from U.S. Pat. No. 4,948,068, to counteract drive torque transmitted to a main helicopter rotor and to control yaw by controlling circulation of airflow around the tail boom and by controlling air expelled laterally through a thruster from a side or sides of the rear end of the tail boom of the helicopter.

The Applicant believes that systems generally corresponding to the system of U.S. Pat. No. 4,948,068 are power hungry and require more power to operate than a comparable conventional tail rotor.

In accordance with a first aspect of this invention, in a helicopter including a main rotor, a tail boom having opposed sides and a rear end portion, a longitudinal circulation control slot along a predetermined one side of the tail boom and a thruster which is accommodated in the rear portion of the tail boom, there is provided a method of operating the thruster, to control yaw of the helicopter, which method includes directing air flow longitudinally along the tail boom toward deflecting vanes of the thruster which deflecting vanes are arranged to deflect longitudinal air flow laterally toward opposed sides of the helicopter and toward openings in the sides of the rear portion of the tail boom; and adjusting, in respect of each opening, a height dimension of the opening, which height dimension is generally normal to both the longitudinal and lateral directions, generally symmetrically from opposed extremities of the opening such that a geometrical centre of the opening remains substantially static regardless of the status of adjustment of the respective opening.

Thus, in use, a centre line of air flow out of the opening will remain static relative to the helicopter regardless of the status of adjustment of the respective opening.

Adjusting the opening may be by moving a pair of shutters from the extremities of the openings selectively toward each other and away from each other.

Preferably, when the tail boom is round, the shutters may be complementally part round, and moving the shutters may be by pivoting the shutters about an axis of the tail boom. Most preferably, the tail boom may be round cylindrical, and the shutters may be complementally part round cylindrical.

Advantageously, the shutters may be linked (e.g. mechanically linked) to be pivotal simultaneously in opposite directions and at equal angular rates. Most advantageously, the pair of shutters may be of a size, shape and arrangement to serve both openings simultaneously, and adjusting the shutters to enlarge one opening may be such as to simultaneously reduce the size of the other opening.

In accordance with a second aspect, the invention extends to a thruster a helicopter which includes a main rotor, a tail boom having opposed sides and a rear end portion adapted to house the thruster, and a longitudinal circulation control slot along a predetermined one side of the tail boom, the thruster comprising deflecting vanes which are arranged, in use, to deflect an air flow stream flowing longitudinally along the tail boom laterally toward opposed sides of the helicopter;

openings in respective sides of the rear end portion for passing the laterally deflected portions of the air flow stream in use;

a shutter assembly arranged in respect of each opening to adjust a height dimension, which will generally be normal to both the longitudinal and lateral directions, generally symmetrically from opposed extremities of each opening such that a geometrical centre of each opening remains substantially static regardless of a status of adjustment of the respective opening.

In a preferred embodiment, the shutter assembly may comprise a pair of shutters which are linked (e.g. mechanically linked) to be movable toward each other and away from each other symmetrically, in opposite directions, at equal angular speeds.

Advantageously, the tail boom may be round, the shutters may be complementally part round and may be pivotal about an axis of the tail boom. Most advantageously, the tail boom may be round cylindrical and the shutters may be correspondingly round cylindrical.

In a most preferred embodiment, the shutters of the pair of shutters may be provided in a size and shape and may be arranged to serve both openings simultaneously such that moving them to enlarge one opening simultaneously reduces the other opening.

The invention extends in respect of a third aspect to a helicopter which includes a main rotor, a tail boom having opposed sides and a rear end portion, a longitudinal circulation control slot along a predetermined one side of the tail boom, and a thruster in accordance with the second aspect of this invention and mounted in the rear end portion of the tail boom.

The invention is now described by way of example with reference to the accompanying diagrammatic drawings. In the drawings FIG. 1 shows, schematically in side view, a helicopter in accordance with the invention;

FIG. 2 shows, to an enlarged scale, in part sectional plan view, a thruster mechanism in accordance with the invention and forming part of the helicopter of FIG. 1;

Figure 3:
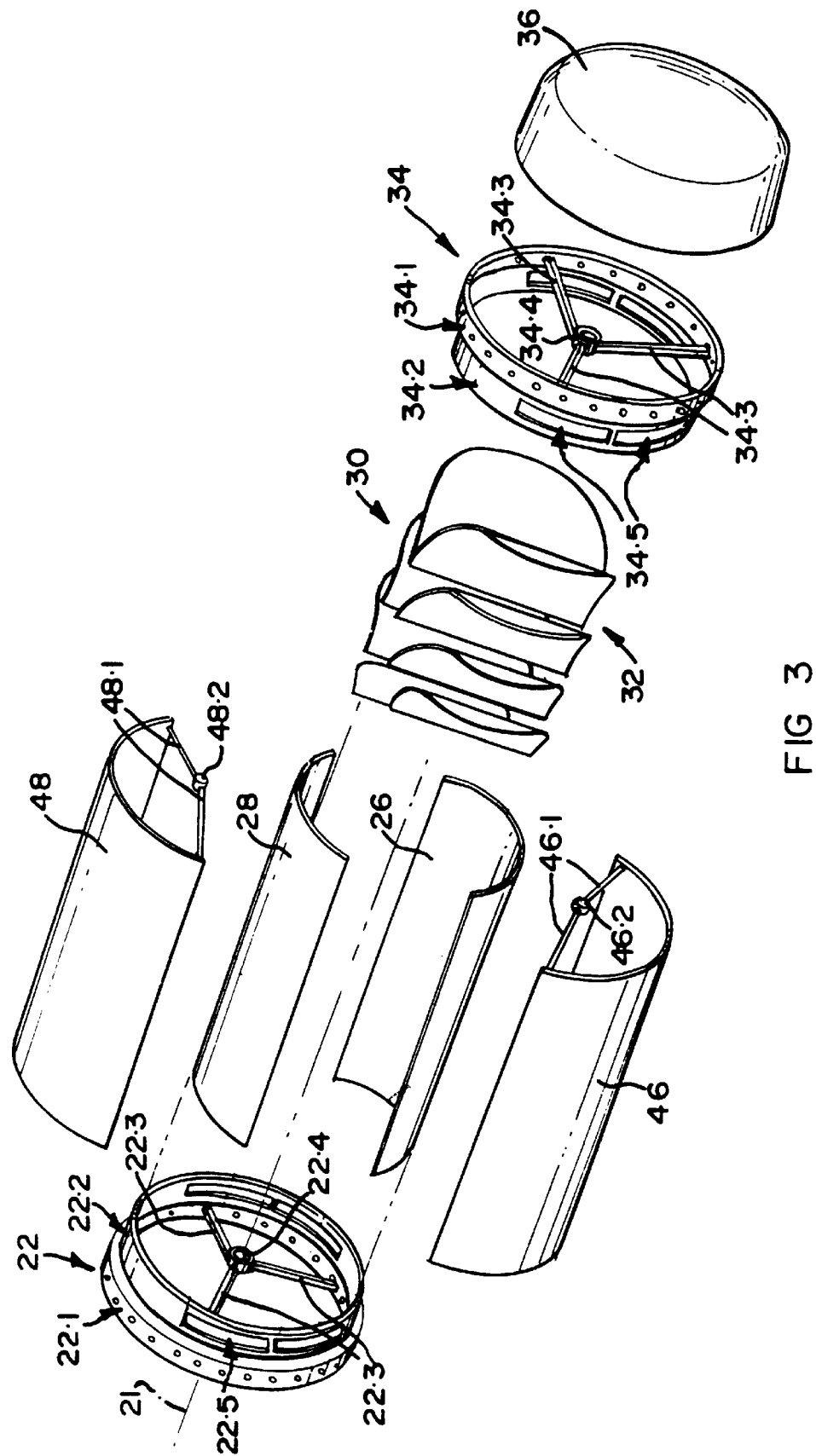
FIG. 3 shows, in exploded view, components of the thruster mechanism of FIG. 2.
Figure 4:
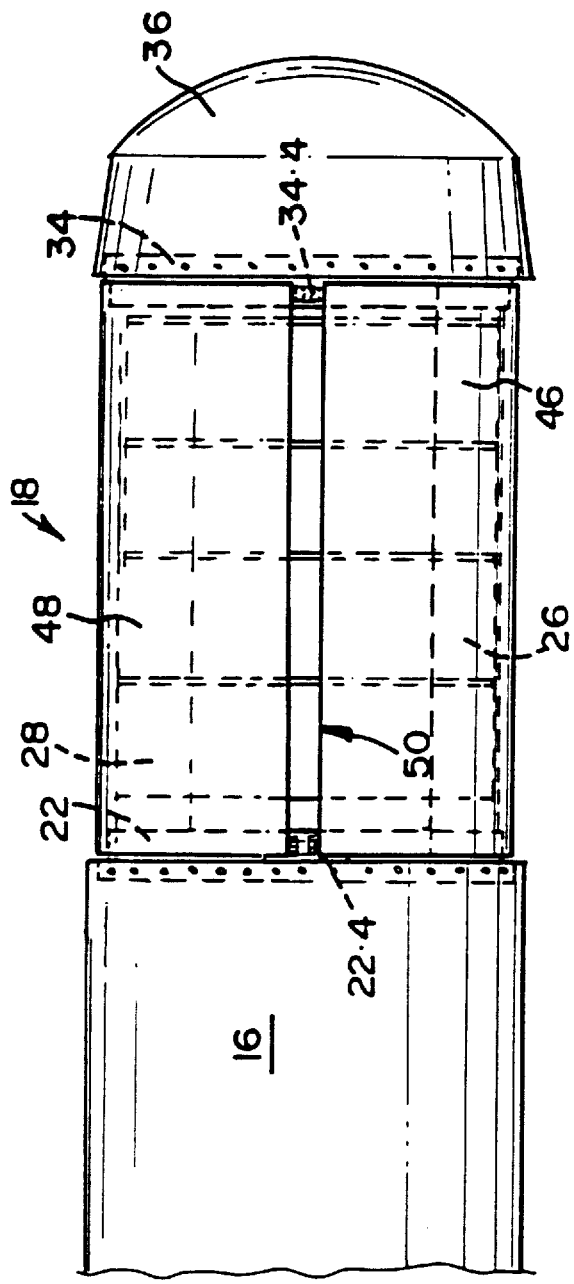
FIGS. 4 and 5 show, in side views, the thruster mechanism of FIGS. 2 and 3 in two differently adjusted conditions.

With reference to FIG. 1 of the drawings, a helicopter in accordance with the invention is generally indicated by reference numeral 10. It comprises a body 12 forming a cockpit and a passenger or payload enclosure and also an engine compartment of the helicopter. The helicopter 10 has a main rotor 14 generally above the body 12. From a rear of the body 12, a tail boom, and in this embodiment a round cylindrical tail boom, generally indicated by reference numeral 16, extends outwardly. A rear portion of the tail boom 16, as generally indicated by reference numeral 18, accommodates a thruster mechanism in accordance with this invention. Along a predetermined one side of the tail boom 16, there is provided a circulation control slot 20.

In operation, air under pressure is directed laterally outwardly from the circulation control slot 20 which laterally deflected air co-operates with downwash of the main rotor 14 to generate torque counteracting the torque associated with driving the main rotor 14.

To control yaw of the helicopter 10, there is provided a thruster mechanism in the rear end portion 18. The thruster mechanism and operation thereof are described in more detail below.

With reference to FIGS. 2 to 5, the thruster mechanism is accommodated in the rear portion 18. It is symmetrically arranged about a centre line 21 of the tail boom 16.

The thruster mechanism comprises a fore annular flange 22 which is attached spigot-socket fashion generally as indicated by reference numeral 24 to the tail boom 16 by means of screws, rivets, or the like. A part round cylindrical wall portion 26 is rigidly and co-axially fixed to the fore flange 22 along a bottom of the rear end portion 18. Similarly, a part round cylindrical wall portion 28 is rigidly and co-axially fixed to the fore flange 22 to extend along a top of the rear portion 18. The wall portions 26, 28 rigidly and co-axially mount a rear annular flange 34 at rear ends thereof. Thus, a round cylindrical volume is defined longitudinally between the fore flange 22 and the rear flange 34 and circumferentially between the lower wall portion 26 and the upper wall portion 28.

The rear end portion 18 is closed from the rear by means of a dished rear closure 36 mounted on a spigot-socket fashion as shown by reference numeral 38 on the rear flange 34.

Two sets of deflecting vanes or vanes, each set of this embodiment comprising four vanes, are mounted between the wall portions 26, 28. The sets of vanes are mounted symmetrically to either side of an upright plane co-inciding with the centre line 21 and the vanes are respectively mirror images. Each set of vanes comprises a rear vane 30.1, 32.1 which, when seen in plan view as in FIG. 2, is in the form of a quadrant, a radius thereof corresponding to the radius of the rear end portion 18. Each vane 30.1, 32.1 is arranged around a centre line which extends vertically and co-incides with a lateral extremity of the rear end portion 18.

Spaced forward of each of the vanes 30.1, 32.1, there is provided a second vane 30.2, 32.2, also in the form of a circle quadrant when seen in plan view but having a smaller radius and arranged such that a lateral extremity thereof ends on the periphery of the rear end portion 18, and an inner extremity thereof is spaced laterally from the centre line 21.

Further pairs of vanes 30.3, 32.3; 30.4, 32.4 are provided in progressively smaller format.

The vanes are arranged such that, when viewed longitudinally from a front of the tail boom 16, the one set of vanes is housed in the one side of the rear end portion and the other set of vanes is housed in the other side of the rear end portion 18. Furthermore, inner fore ends of the vanes are directed tangentially longitudinally forwardly and outer rear ends of the vanes are directed tangentially laterally outwardly.

Furthermore, conveniently, each of the smallest, forward vanes 30.4, 32.4 is exposed to an envelope of flow of predetermined cross sectional flow area. The extent to which each of the second foremost vanes 30.3, 32.3 extends inwardly beyond the extremity of the foremost vane 30.4, 32.4 when seen in longitudinal projection corresponds to a second envelope of flow of cross-sectional flow area corresponding to the cross-sectional flow area of the first envelope of flow.

Similarly, each of the second rearmost vanes 30.2, 32.2 is arranged to be exposed to an envelope of flow of equal cross-sectional flow area and each of the rearmost vanes 30.1, 32.1 is exposed to an envelope of flow equal in cross-sectional flow area. Thus, each vane in each half of the rear end portion is arranged nominally to deflect one quarter of the flow in that half of the rear end portion.

Correspondingly, when viewed laterally, the spacings of the vanes are equal. This arrangement is intended to provide for flow of nominally constant speed through the thruster and outwardly through openings in sides of the rear end portion 18.

It is emphasized that this arrangement may not be critical, and may not even be important. Furthermore, it is appreciated by the Applicant that flow will not be homogenous in the opposed sides of the tail boom, and will strongly depend on the extents to which the openings are rendered open as will be described hereinafter.

Figure 5:
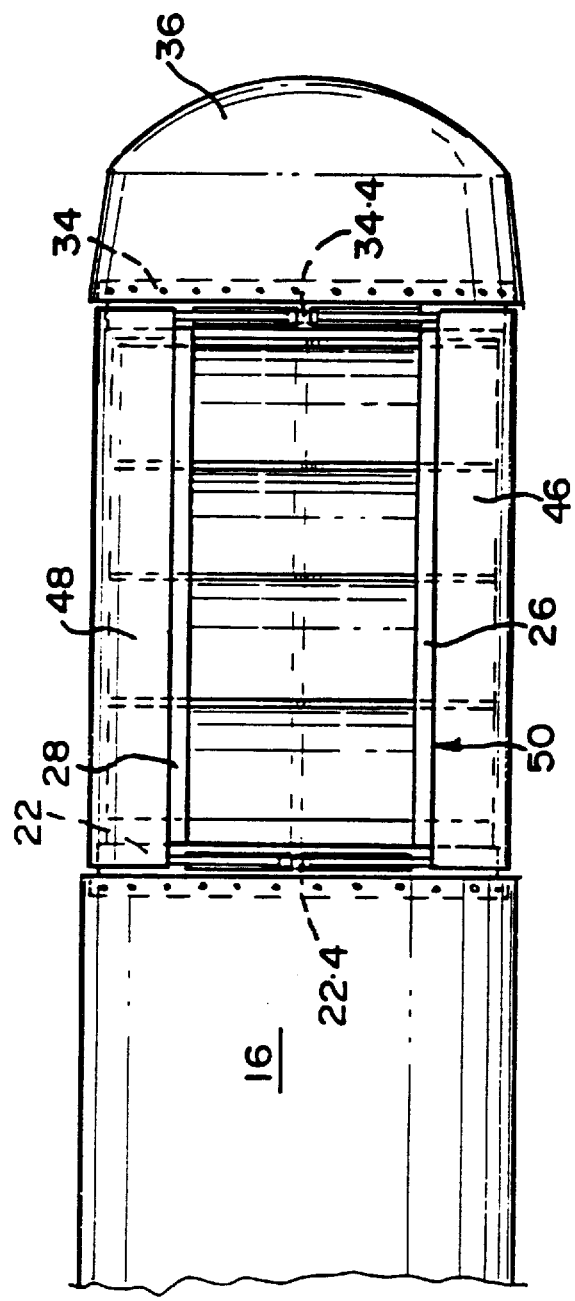

As can best be perceived from FIG. 5, longitudinally extending, laterally directed openings are defined between vertically or circumferentially spaced longitudinal edges of the wall portions 26, 28. The sets of vanes 30, 32 are arranged to deflect longitudinal flow along the tail boom 16 laterally through the respective openings.

The thruster mechanism further comprises a pair of shutters respectively indicated by reference numerals 46, 48. Each shutter 46, 48 is of part round cylindrical form and of a radius such as to be concentric snugly outside the wall portions 26, 28. Each shutter 46, 48 has, toward longitudinal ends thereof, a pair of spokes 46.1, 48.1 and bearing means 46.2, 48.2 mounted at the inner ends of the spokes and interconnecting the inner ends of the spokes. The shutters 46, 48 are mounted respectively on the fore flange 22 and the rear flange 34. For mounting purposes, each of the fore flange 22 and the rear flange 34 has inwardly directed spokes respectively at 22.3, 34.3 mounting a bearing journal 22.4, 34.4 on the centre line of the tail boom 16. The bearing means 46.2, 48.2 are rotatably supported on such journals. To pass the spokes 46.1, 48.1, the flanges 22, 34 have appropriately positioned part circumferential slots 22.5, 34.5 to allow also pivoting of the shutters 46, 48.

If the shutters 46, 48 are arranged respectively symmetrically along the bottom and symmetrically along the top of the rear end portion 18, the longitudinal edges of the shutters 46, 48, which edges at each side will be vertically or circumferentially spaced, define equal openings which will be smaller than the openings defined between the wall portions 26, 28. Each such opening will have a height corresponding to a predetermined included angle relative to the centre line of the tail boom. In this embodiment, such included angle is about 76°. As will be described briefly hereinafter, the shutters 46, 48 can be pivoted in synchronism such that, at one sides the edges move toward each other and the edges at the opposed side move simultaneously away from each other, and vice versa. Movement can be such that the edges along one side of the tail boom can touch. At the opposed side of the tail boom, the opening will then be at a maximum, and vice versa. The opening between the wall portions 26, 28 at each side will generally correspond to the maximum opening of the shutters 46, 48.

Control of yaw of the helicopter is effected by pivoting the shutters 46, 48 appropriately. Thus, in one extreme condition of the shutters, one opening will be closed and no lateral flow of air will take place through that side while, at the opposed side, the opening will be at a maximum and all of the lateral flow will take place at that side. Naturally, pivoting of the shutters will be selective and progressive in stepless fashion or in small steps at the option of a pilot or operator of the helicopter. Control means will be provided for this purpose in the cockpit and link means between the control means and the shutters in any suitable and convenient fashion, e.g. by means of cables, pulleys and the like, will be provided.

It is to be appreciated that pivoting of the shutters takes place in synchronism such that a centre of the opening between the shutters at each side will remain substantially static. This will cause flow directed laterally to be in an envelope the centre of which will correspond with the centre of the opening which will be static.

I claim:

1. In a helicopter including a main rotor, a tail boom having opposed sides and a rear end portion, a longitudinal circulation control slot along a predetermined one side of the tail boom and a thruster which is accommodated in the rear portion of the tail boom, a method of operating the thruster to control yaw of the helicopter, the method comprising the steps of:

directing an air flow longitudinally along the tail boom toward deflecting vanes of the thruster, the deflecting vanes being arranged to deflect longitudinal air flow laterally toward opposed sides of the helicopter and toward openings in the sides of the rear portion of the tail boom; and adjusting, with respect to each opening, a height dimension of the opening using shutters, the height dimension being generally normal to both a longitudinal direction which corresponds to a general direction of extension of the tail boom and a lateral direction which is lateral to the longitudinal direction, the height dimension being generally symmetrical from opposed extremities of the opening such that a geometrical centre of the opening remains substantially static regardless of a status of the adjustment of the respective opening, wherein the shutters rotate about a longitudinal axis of the helicopter.

2. A method as claimed in claim 1 in which adjusting the opening is by moving the shutters from the extremities of the openings selectively toward each other and away from each other.

3. A method as claimed in claim 2, in which the tail boom is round, in which the shutters are complementally part round, and in which moving the shutters is by pivoting the shutters about an axis of the tail boom.

4. A method as claimed in claim 3 in which the shutters are linked to be pivotal simultaneously in opposite directions and at equal angular rates.

5. A method as claimed in claim 2, in which the pair of shutters is of a size, shape and arrangement to serve both openings simultaneously, and in which adjusting the shutters to enlarge one opening simultaneously reduces the size of the other opening.

6. A thruster for a helicopter which includes a main rotor, a tail boom having opposed sides and a rear end portion adapted to house the thruster, and a longitudinal circulation control slot along a predetermined one side of the tail boom, the thruster comprising:

deflecting vanes which are arranged, in use, to deflect an air flow stream flowing longitudinally along the tail boom laterally toward opposed sides of the helicopter;

openings in respective sides of the rear end portion for passing the laterally deflected portions of the air flow stream in use; and a shutter assembly arranged with respect to each opening to adjust a height dimension of at least one of the openings, which will generally be normal to both of longitudinal and lateral directions, the height dimension being generally symmetrical from opposed extremities of each opening such that a geometrical centre of each opening remains substantially static regardless of a status of adjustment of the respective opening, wherein the shutter assembly includes a plurality of shutters, and wherein the shutters rotate about a longitudinal axis of the helicopter.

7. A thruster as claimed in claim 6 in which the at least one shutter comprises a pair of shutters which are linked to be movable toward each other and away from each symmetrically, in opposite directions, at equal angular speeds.

8. A thruster as claimed in claim 7 in which the tail boom is round, and in which the shutters are complementally part round and are pivotal about an axis of the tail boom.

9. A thruster as claimed in claim 8 in which the tail boom is round cylindrical and the shutters are correspondingly round cylindrical.

10. A thruster as claimed in claim 7, in which the shutters of the pair of shutters are provided in a size and shape and are arranged to serve both openings simultaneously such that moving them to enlarge one opening simultaneously reduces the other opening.

11. A helicopter, comprising:

a thruster;

a main rotor;

a tail boom having opposed sides and a rear end portion adapted to house the thruster; and a longitudinal circulation control slot along a predetermined one side of the tail boom, wherein the thruster includes:

deflecting vanes which are arranged, in use, to deflect an air flow stream flowing longitudinally along the tail boom laterally toward opposed sides of the helicopter, openings in respective sides of the rear end portion for passing the laterally deflected portions of the air flow stream in use, and a shutter assembly arranged with respect to each opening to adjust a height dimension of at least one of the openings, which will generally be normal to both of longitudinal and lateral directions, the height dimension being generally symmetrical from opposed extremities of each opening such that a geometrical centre of each opening remains substantially static regardless of a status of adjustment of the respective opening, and wherein the shutter assembly includes a plurality of shutters, and wherein the shutters rotate about a longitudinal axis of the helicopter.

12. In a helicopter including a main rotor, a tail boom having opposed sides and a rear end portion, a longitudinal circulation control slot along a predetermined one side of the tail boom and a thruster which is accommodated in the rear portion of the tail boom, a method of operating the thruster to control yaw of the helicopter, the method comprising the steps of:

directing an air flow longitudinally along the tail boom toward deflecting vanes of the thruster, the deflecting vanes being arranged to deflect longitudinal air flow laterally toward opposed sides of the helicopter and toward openings in the sides of the rear portion of the tail boom; and adjusting, using a pair of oppositely situated shutters which are movable simultaneously toward one another and away from one another, a respective opening of the openings in an approximately symmetrical manner from opposed extremities of the respective opening such that a geometrical centre of the respective opening remains substantially static regardless of a status of the adjustment of the respective opening, wherein the shutters rotate about a longitudinal axis of the helicopter.

13. The method as claimed in claim 12, in which the tail boom is round, in which the shutters are complementary part round, and in which the shutters are moved by pivoting the shutters simultaneously in opposite directions at equal angular rates about an axis of the tail boom.

14. The method as claimed in claim 13, in which the pair of shutters are sized, shaped and arranged to serve at least two of the openings simultaneously, and in which adjusting the shutters to enlarge one of the openings simultaneously reduces the size of another one of the openings.

15. A thruster for a helicopter which includes a main rotor, a tail boom having opposed sides and a rear end portion adapted to house the thruster, and a longitudinal circulation control slot along a predetermined one side of the tail boom, the thruster comprising:

deflecting vanes which are arranged, in use, to deflect an air flow stream flowing longitudinally along the tail boom laterally toward opposed sides of the helicopter;

openings in respective sides of the rear end portion for passing the laterally deflected portions of the air flow stream in use; and a pair of oppositely situated shutters arranged with respect to each respective opening of the openings to adjust each respective opening from opposed extremities of the respective opening in an approximately symmetrical manner such that a geometrical centre of each opening remains substantially static regardless of a status of adjustment of the respective opening, wherein the shutters rotate about a longitudinal axis of the helicopter.

16. The thruster as claimed in claim 15, in which the tail boom is round, in which the shutters are complementary part round, and in which the shutters are moved by pivoting the shutters simultaneously in opposite directions at equal angular rates about an axis of the tail boom.

17. The thruster as claimed in claim 16, in which the pair of shutters are sized, shaped and arranged to serve at least two of the openings simultaneously, and in which moving the shutters to enlarge one of the openings simultaneously reduces the size of another one of the openings.

18. A helicopter, comprising:

a thruster;

a main rotor;

a tail boom having opposed sides and a rear end portion adapted to house the thruster; and a longitudinal circulation control slot along a predetermined one side of the tail boom, wherein the thruster includes:

deflecting vanes which are arranged, in use, to deflect an air flow stream flowing longitudinally along the tail boom laterally toward opposed sides of the helicopter, openings in respective sides of the rear end portion for passing the laterally deflected portions of the air flow stream in use, and a pair of oppositely situated shutters arranged with respect to each respective opening of the opening to adjust each respective opening from opposed extremities of the respective opening in an approximately symmetrical manner such that a geometrical centre of each opening remains substantially static regardless of a status of adjustment of the respective opening, and wherein the shutters rotate about a longitudinal axis of the helicopter.

* * * * *